US006791579B2

(12) United States Patent
Markel (10) Patent No.: US 6,791,579 B2
(45) Date of Patent: Sep. 14, 2004

(54) METHOD OF ENHANCING STREAMING MEDIA CONTENT

(75) Inventor: Steven O. Markel, Highlands Ranch, CO (US)

(73) Assignee: Intellocity USA, Inc., San Francisco, CA (US)

( * ) Notice: Subject to any disclaimer, the term of this patent is extended or adjusted under 35 U.S.C. 154(b) by 512 days.

(21) Appl. No.: 09/941,246

(22) Filed: Aug. 27, 2001

(65) Prior Publication Data

US 2002/0089530 A1 Jul. 11, 2002

Related U.S. Application Data (63) Continuation-in-part of application No. 09/935,492, filed on Aug. 25, 2001, and a continuation-in-part of application No. 09/933,927, filed on Aug. 21, 2001.
(60) Provisional application No. 60/227,930, filed on Aug. 25, 2000, provisional application No. 60/227,918, filed on Aug. 25, 2000, and provisional application No. 60/227,063, filed on Aug. 21, 2000.

(51) Int. Cl.[7] .............................. G06F 3/14; G06F 9/04; H04N 7/00
(52) U.S. Cl. ..................... 345/719; 345/760; 345/763; 345/721; 345/749; 345/769; 715/512; 715/500.1; 715/517; 717/109; 709/219
(58) Field of Search .................... 345/719, 760, 345/769, 716–717, 720, 721, 726, 723, 731–732, 730, 764, 762–763, 748–749, 733; 715/512, 500.1, 513, 517, 901, 501.1, 526, 530; 717/109–110, 113, 120–121, 136, 138; 709/203, 219, 217

(56) References Cited

U.S. PATENT DOCUMENTS 5,467,288 A  11/1995  Fasciano et al. ........ 364/514 R
5,524,193 A   6/1996  Covington et al. ......... 395/154
5,583,980 A  12/1996  Anderson .................... 395/173
5,600,775 A   2/1997  King et al. .................. 395/806
5,655,144 A   8/1997  Milne et al. ................ 395/807
5,680,639 A  10/1997  Milne et al. ................ 395/806
5,708,845 A   1/1998  Wistendahl et al. ........ 395/154
5,929,849 A   7/1999  Kikinis ....................... 345/327
5,931,908 A   8/1999  Gerba et al. ................ 709/219
5,951,639 A   9/1999  MacInnis .................... 709/217
6,006,241 A  12/1999  Purnaveja et al. .......... 707/512
6,154,771 A  11/2000  Rangan et al. ............. 709/217
6,173,317 B1  1/2001  Chaddha et al. ............ 709/219
6,201,538 B1 * 3/2001  Wugofski .................... 345/716

(List continued on next page.)

FOREIGN PATENT DOCUMENTS

WO  WO 96/19779  6/1996  .......... G06T/13/00
WO  WO 00/19662  4/2000  .......... H04L/12/18
WO  WO 00/43899  7/2000  ......... G06F/15/167
WO  WO 02/19718  7/2002  ............ H04N/7/24

OTHER PUBLICATIONS

"Openauthor, overview, technical white paper," Open TV, Jul. 1998, XP002090104, the whole document.

(List continued on next page.)

*Primary Examiner*—Raymond J. Bayerl
(74) *Attorney, Agent, or Firm*—Morrison & Foerster LLP (57) ABSTRACT

A graphical user interface, providing local drag and drop functions, is employed to position text and graphic elements on a video frame image. Frame number, element position, and element attributes are employed to create an enhancement file. The enhancement file is employed to embed a trigger, comprising information that identifies a video frame to be enhanced and a locator indicating where enhancement information may be accessed, into a streaming media file to create and enhanced streaming media file. An HTML/Javascript page embeds a media player and includes software to detect a trigger, access enhancement information, and to render the enhancement information in response to the trigger.

20 Claims, 8 Drawing Sheets

U.S. PATENT DOCUMENTS

| | | | |
|---|---|---|---|
| 6,230,172 B1 | 5/2001 | Purnaveja et al. | 707/512 |
| 6,449,653 B2 * | 9/2002 | Klemets et al. | 709/219 X |
| 6,551,357 B1 * | 4/2003 | Madduri | 715/512 |
| 6,560,777 B2 * | 5/2003 | Blackketter et al. | 725/110 |
| 2001/0023436 A1 * | 9/2001 | Srinivasan et al. | 709/219 |

OTHER PUBLICATIONS

Watson, "Scripting the web (times 2)," Online!, Aug. 30, 1996, XP002197873, retrieved from the internet: <URL: http://groups.google.google.com/groups?q=javascript+hypermedia&hl=en&selm=cwatson–3008961022470001%40204.212.150.108&rnum=7> retrieved on May 2, 2002, the whole document.

PCT International Search Report, May 2, 2002.

PCT International Preliminary Examination Report (PCT/US01/41897), Dec. 13, 2002.

U.S. patent application Ser. No. 09/933,927, filed Aug. 21, 2001, System and Method for Distribution of Interactive Content to Multiple Targeted Presentation Platforms—by Steven O. Markel.

U.S. patent application Ser. No. 09/935,492, filed Aug. 23, 2001, System and Method for Web Based Enhanced Interactive Television Content Page Layout—by Steven O. Markel.

* cited by examiner

METHOD OF ENHANCING STREAMING MEDIA CONTENT

CROSS REFERENCE TO RELATED APPLICATIONS

This application is based upon and claims the benefit of U.S. provisional application No. 60/227,918, entitled "METHOD OF ENHANCING STREAMING MEDIA CONTENT", filed Aug. 25, 2000 by Steve O. Markel; and is a continuation-in-part of U.S. non-provisional application Ser. No. 09/935,492, entitled "SYSTEM AND METHOD FOR WEB BASED ENHANCED INTERACTIVE TELEVISION CONTENT PAGE LAYOUT", filed Aug. 25, 2001, which is based upon and claims the benefit of U.S. provisional application No. 60/227,930 filed Aug. 25, 2000, having the same title; and non-provisional application Ser. No. 09/933,927 entitled "SYSTEM AND METHOD FOR DISTRIBUTION OF INTERACTIVE CONTENT TO MULTIPLE TARGETED PRESENTATION PLATFORMS", filed Aug. 21, 2001, which is based upon and claims the benefit of U.S. provisional application serial No. 60/227,063, entitled "A DATA DRIVEN SYSTEM AND METHOD FOR DISTRIBUTION OF INTERACTIVE CONTENT TO MULTIPLE TARGETED PRESENTATION PLATFORMS", filed Aug. 21, 2000. All of these applications are specifically incorporated herein by reference for all that they disclose and teach.

BACKGROUND OF THE INVENTION a. Field of the Invention

The present invention relates to streaming media, such as video streams transferred across the Internet, and more particularly, to a method and system that produces enhanced content that may be employed with streaming media.

b. Description of the Background

Streaming media files, such as video and sound files, may be hosted at a web server, and then may be transmitted over the Internet or other network to a requesting user. A streaming media player, such as Microsoft Windows® Media Player, may be employed to play a media file within a user's browser. While the images that may comprise streaming media content may be similar in appearance to television, enhancement of streaming media exhibits a number of differences. Enhancement refers to the display of elements such as text, graphics and images in conjunction with a video presentation. Display elements such as text, graphics, and images, for example, may be in proximity to a video image, or may overlay a video image. Display elements may also have links associated with them such that selection of the element, such as a displayed icon, or selection of the video area, may provide access to a web page, other information, or may launch another application. A prominent difference between television enhancement and enhancement of streaming media is that there are few tools and standards for streaming media enhancement, if any. In a manner similar to television, streaming media enhancements provide an opportunity for increased viewer satisfaction and also provide an opportunity for increased revenue through advertising, vendor association with a displayed product, and modification of advertising, such as local dealer information being displayed in conjunction with an advertisement. As such, a new method that provides a method and tools for streaming media enhancement is needed.

SUMMARY OF THE INVENTION

The present invention overcomes the disadvantages and limitations of the prior art by providing a system and method for creating enhanced content for streaming media and for outputting an enhancement file suited to streaming media. The authoring tools of the present invention provides an easy to use visual interface that allows a user to open a streaming video file, position the video to a desired frame, and add text and graphic enhancements.

Commands employed to place the graphics and text enhancements are termed triggers. Each trigger uniquely specifies a text or graphic element, a location, and a time. A trigger may also contain an address where a graphic may be accessed. A text trigger may indicate font, font size, color and other attributes, plus location of where the text is displayed. Triggers may be grouped into a text file, using a scripting language such as XML for example, and then may be embedded into a streaming media file. The resultant enhanced streaming media file may be saved on a web server. In addition to the enhanced streaming media file, an HTML/JavaScript "wrapper" page is generated. The HTML/Javascript page embeds a streaming media player object as well as the software code necessary to interpret the embedded triggers.

The invention therefore may comprise a method for creating an enhanced streaming media file comprising: defining a first window in a graphical user interface; displaying a streaming video file in a media player window contained in the first window; pausing the media player at one frame of a plurality of frames comprising the streaming video file; placing a displayable element at a position in the first window employing a pointing device and employing a drag and drop function responsive to an input from the pointing device, the drag and drop function implemented locally in the graphical user interface; creating an enhancement file containing information related to the displayable element, and the one frame; modifying a file containing a video stream to produce a modified video stream file containing a trigger comprising information that identifies a video frame to be enhanced and a locator indicating where enhancement information may be accessed; and embedding a media player and a software routine in a web displayable page wherein the media player is operable to display a video stream, and the software routine is operable to detect a trigger in the video stream, to access enhancement information employing a locator in the video stream, and to render enhancements defined by the enhancement information.

A user may access a web server with a browser and download the enhanced streaming media file and the HTML/JavaScript page. As the enhanced streaming media file plays, the wrapper HTML/JavaScript code interprets triggers contained in the enhanced streaming media file and renders the graphics or text elements. The invention may be implemented in a web browser, allowing remote editing and preview of enhancements.

The invention may further comprise a system for creating an enhanced streaming media file comprising: a computer; a web browser; a graphical user interface disposed in the browser; a streaming media player disposed in the graphical user interface; a first software program associated with the graphical user interface that allows a user to select a displayable element and to position the displayable element over an image displayed by the streaming media player, the first software program further provides a function to alter the position of the displayable element in response to input from a pointing device, the function implemented locally in the graphical user interface; a second program that embeds information associated with the displayable element into a streaming media file; and a third program that produces a web displayable page that embeds a media player operable to display a video stream and a software routine that detects a trigger contained in the video stream and that accesses enhancement information and renders an enhancement in response to the trigger.

Advantageously, the present invention allows easy enhancement of streaming video, providing lower cost for creating enhancements and providing new opportunities for increased viewer enjoyment, and for increased revenue generation through advertising links, advertising customization, and interactive promotions.

DESCRIPTION OF THE FIGURES

In the figures.

DETAILED DESCRIPTION OF THE INVENTION

Enhanced content is typically presented using a combination of HTML, JavaScript, Java and other web technologies. Presentation of enhanced content with streaming media requires that enhanced content be authored, scheduled, previewed, and output to an enhanced streaming media file in a format suitable for web display. Authoring comprises selection of elements such as text, graphics, and images and placement of the elements in relation to a displayed video image. Scheduling refers to specification of a time, video frame, or other indication, when enhancements may be displayed. Previewing enhancements may comprise accessing memory containing enhancement information, producing a file of enhancements and triggers, and employing a browser to view the enhancement. Alternately, enhancement information may be stored in a database and may be accessed to produce a file of enhancements and triggers. Output of an enhanced streaming media file may comprise inserting trigger information into a video stream and providing an HTML/Javascript wrapper page that embeds a streaming media player and includes software code to interpret the trigger information, access enhancement information and render enhancements.

Figure 1:
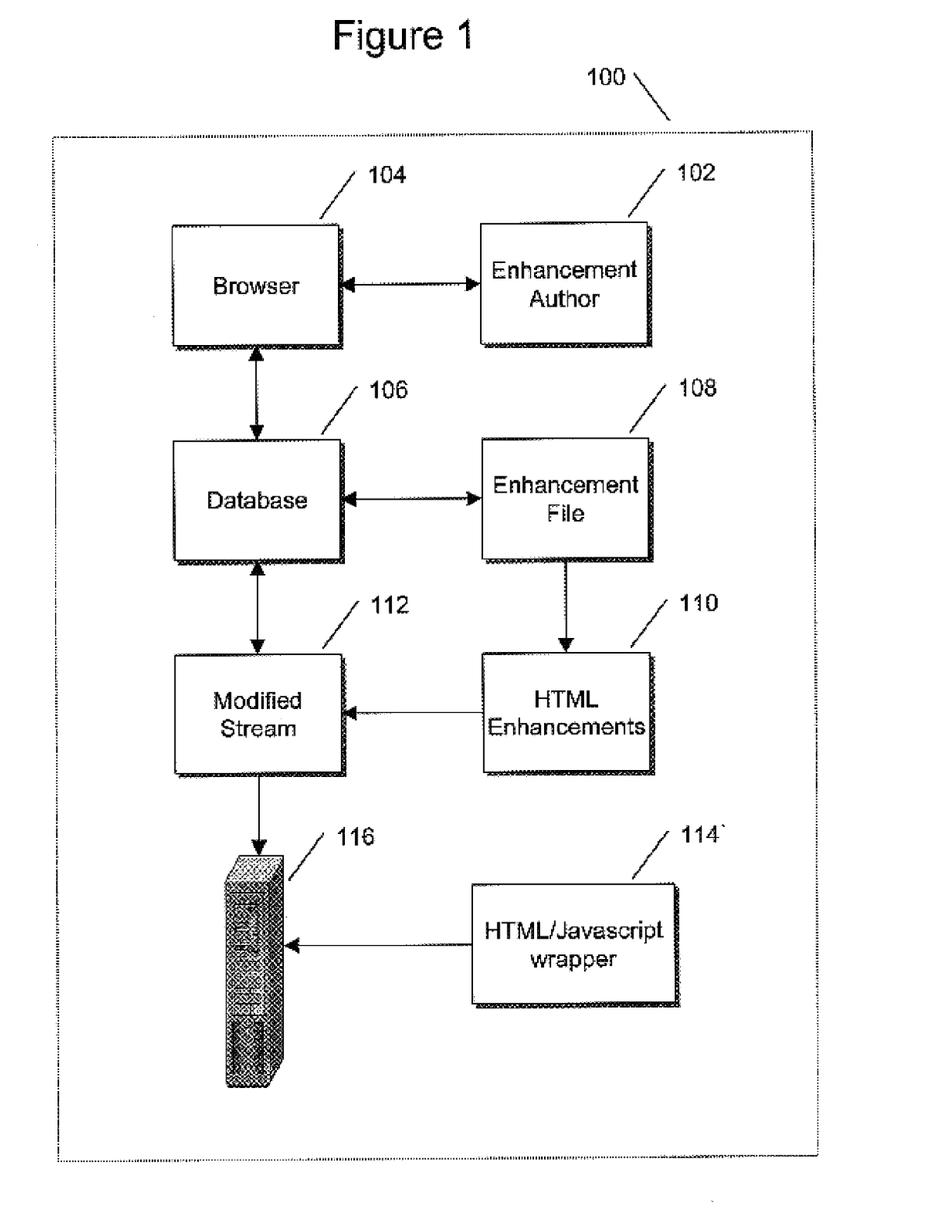
FIG. 1 depicts the functional environment of the present invention.

FIG. 1 depicts the functional environment of the present invention. Environment 100 comprises enhancement author 102 that operates with browser 104. As shall be shown in following figures, enhancement author 102 is employed to select display elements, place them in proximity to a video window, define the attributes of the elements, and define a time at which they may be rendered. Database 106 may store enhancement and project information. An enhancement file 108, that may be an XML script file, comprises element information including element attributes, position, and time. Enhancement file 108 may be processed to produce an HTML enhancements file 110 that may be imported into a streaming media file to produce modified stream 112. Modified stream 112 may then be stored in server 116 and may be accessed for transmission. In addition, an HTML/Javascript wrapper 114 may be created and stored in server 116.

Figure 2:
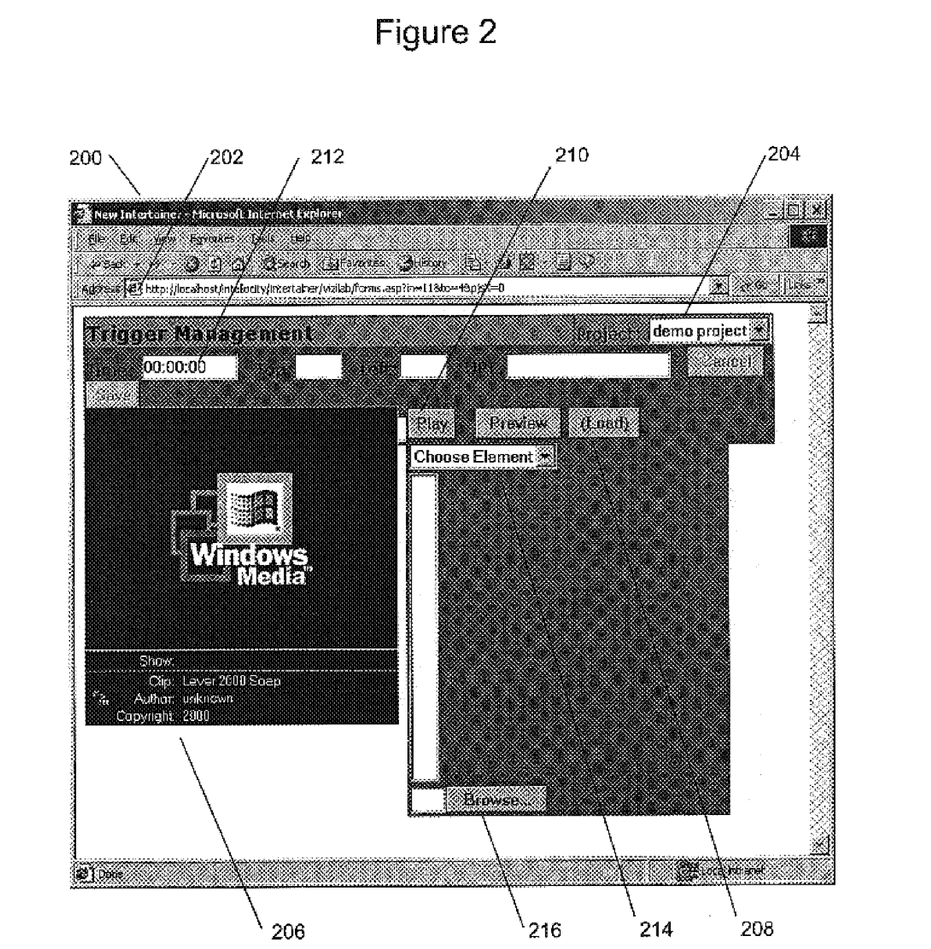
FIG. 2 depicts a trigger management window.

FIG. 2 depicts a trigger management window. Trigger window 200 may be accessed through URL 202. Trigger window 200 comprises video window 204 that displays streaming media images. A project may be selected or specified through project window 206. A streaming video file may be selected with load button 208. Once the video file is loaded, a frame for enhancement may be accessed employing play button 210. Play button 210, once selected, provides a pause function. Alternately, a frame may be selected by entering a value in time window 212. Further, the controls of a media player (controls not depicted) may be employed to select a desired frame. Once a desired frame is selected, element window 214 may be employed to select a text or graphic element from a list of elements. Element window 214 provides a pull-down menu of elements. Browse button 216 allows selection of a directory where a text or graphic element may be accessed.

Figure 3:
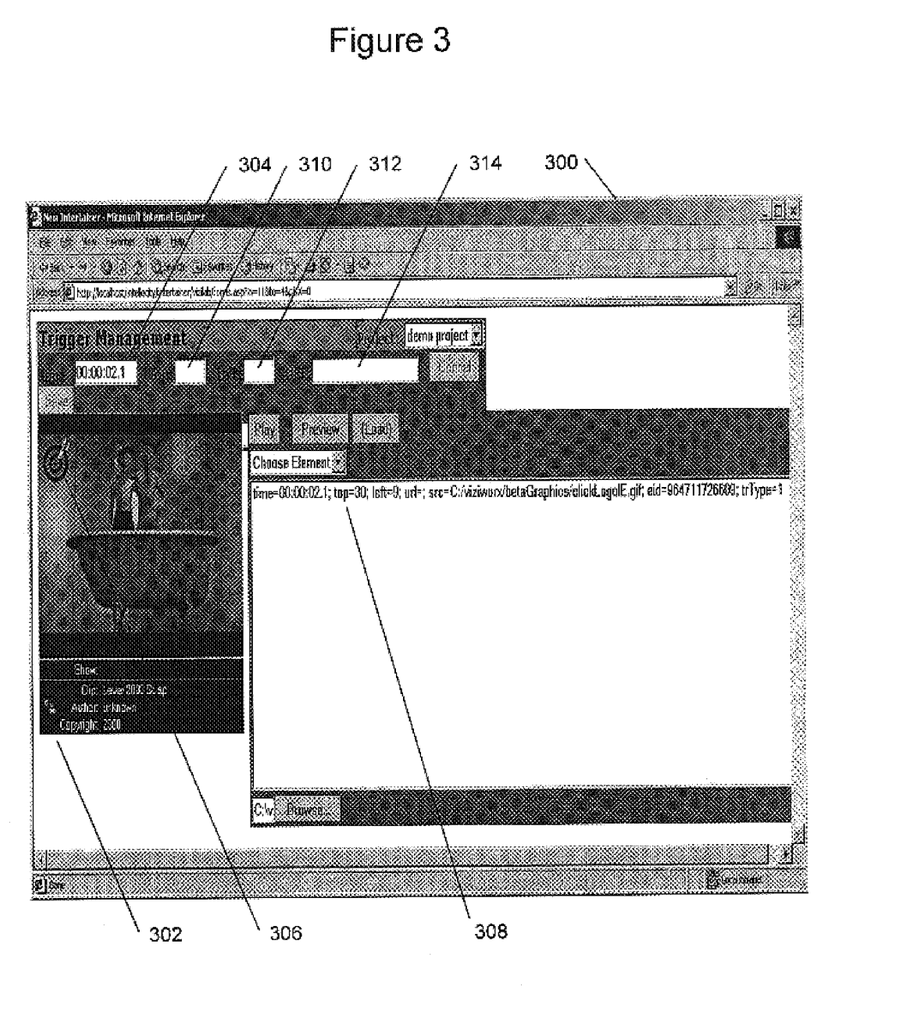
FIG. 3 depicts a trigger window with a selected video file and one enhancement element.
Figure 4:
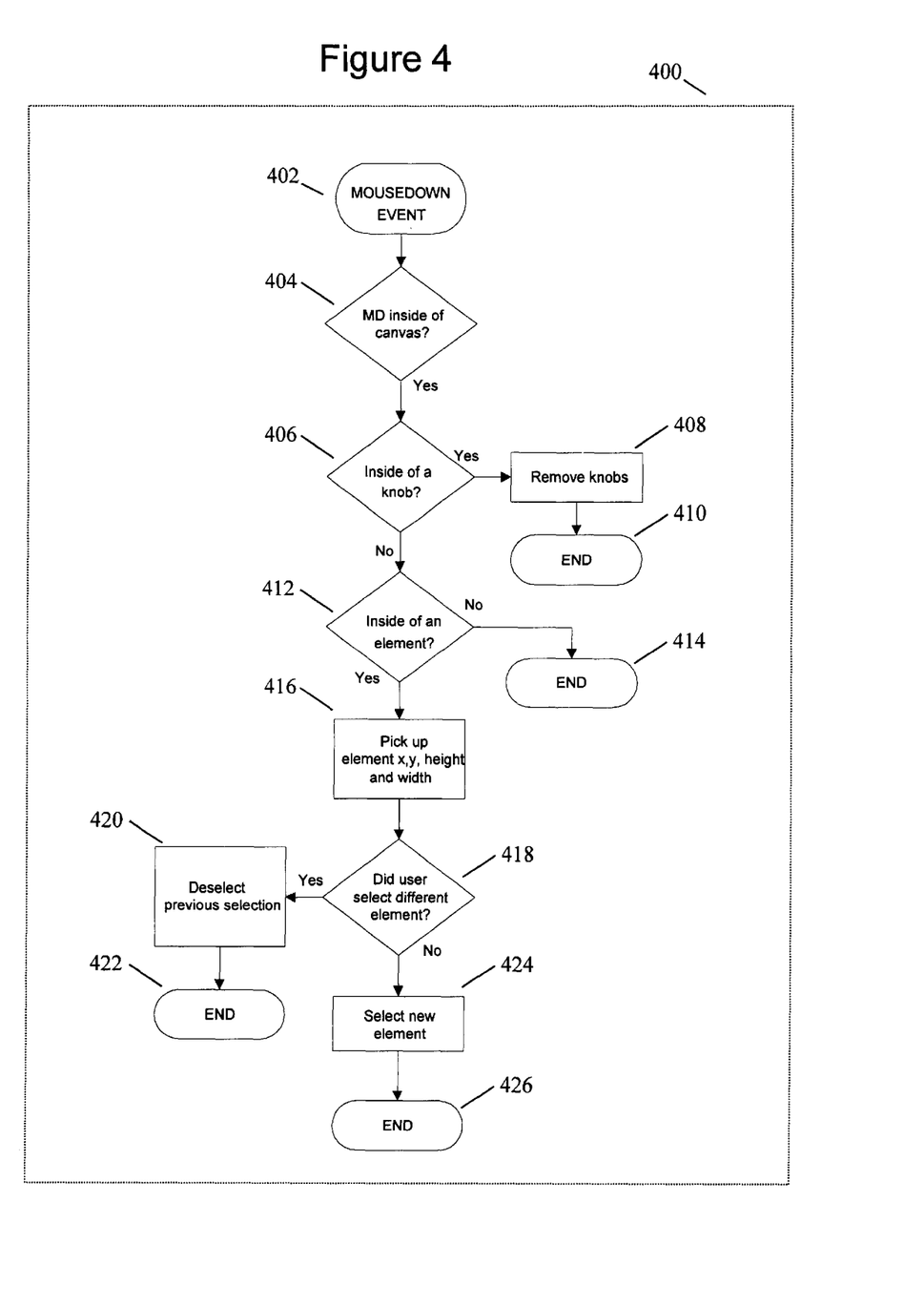
FIG. 4 is a flowchart of a method for selecting an element in the video window.
Figure 5:
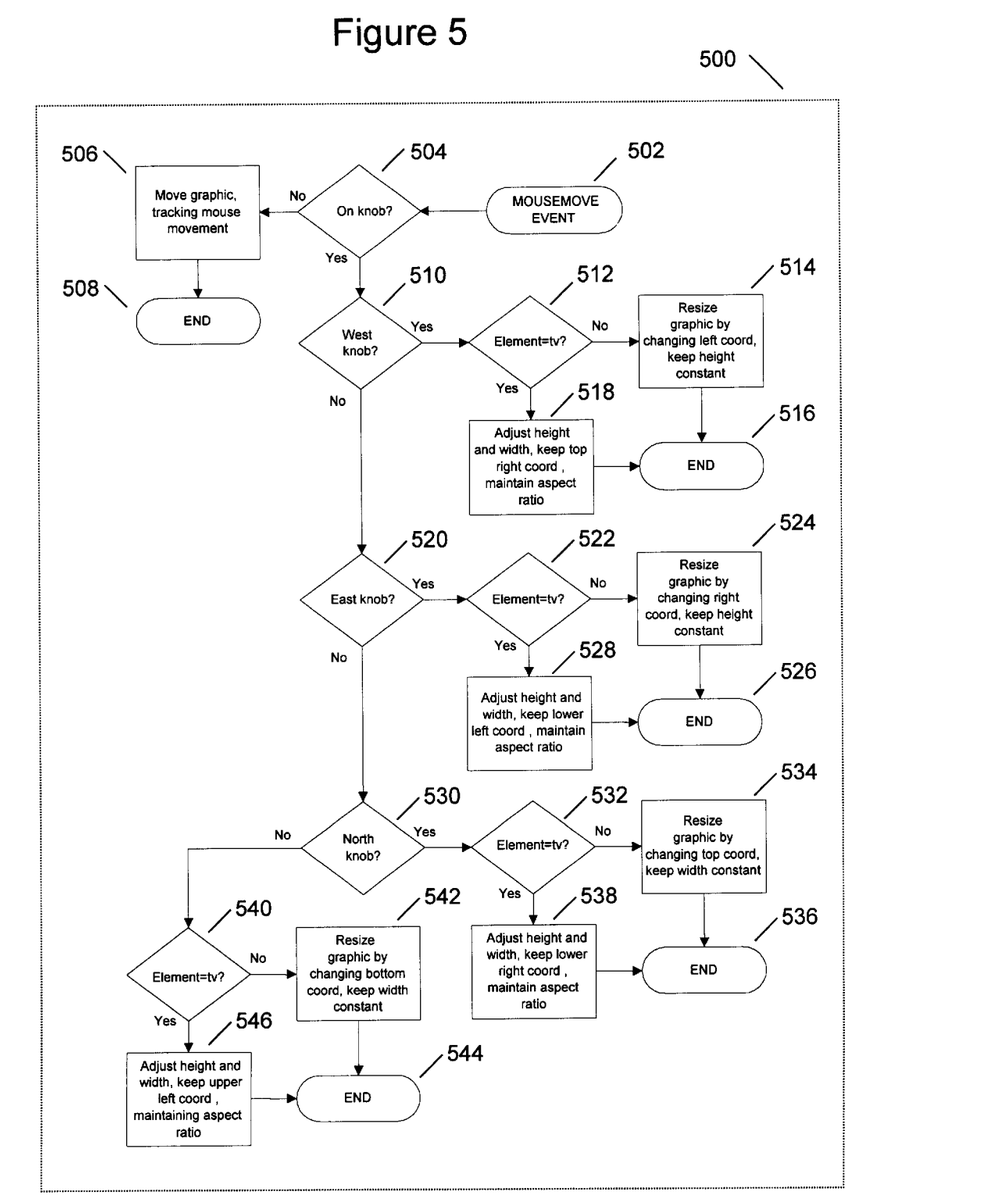
FIG. 5 is a flowchart of a method for moving and/or resizing an element in the video window of the trigger screen.

FIG. 3 depicts a trigger window with a selected video file and one enhancement element. A video file has been opened and a display time selected. Video window 302 shows the video image that reflects the time shown in time window 304. Element 306, a target with arrow, has been placed in the upper left of the video image area. Information describing the time, position, and element are shown in trigger entry 308. When an element is selected through the element window, placement may employ manual entry of position information for the top left corner of the element through top window 310 and left window 312. The URL for the element may also be specified through URL window 314. Placement may also employ a mouse or other pointing device. A software routine downloaded to the browser, providing faster updates than a server-implemented routine, allows the user to drag an element to a desired position. Further, a resizing function may be implemented, allowing the user to alter the size of an element. FIGS. 4 and 5 depict flowcharts for selecting and moving or resizing an element.

FIG. 4 is a flowchart of a method for selecting an element in the video window. Mouse select process 400 begins with a mousedown (button activation) at step 402. Step 404 determines if the mouse position is inside the video window when the button was activated. If the mouse position is outside the video window, mouse data is passed to other programs such as may be employed to select elements or play and pause the video stream. If the mouse position is inside the video window, step 406 determines if the position is inside the knobs of an element. Knobs are visual elements, such as small rectangles, for example, that are displayed at the edges of an element when selected. If the mouse is inside a knob, step 408 removes the knobs and the process ends at step 410. If step 406 determines that the mouse position is not inside a knob, step 412 determines if the mouse position is inside an element. If the mouse position is not inside an element, the process ends at step 414. If step 412 determines that the mouse position is inside an element, step 416 obtains the element's x and y position, height, and width. Step 418 then determines if the user selected a different element. If a different element was selected, step 420 deselects the previous selection and the process sends at step 422. If the user did not select a difference element, the new element is selected at step 424 and the process ends at step 426.

Having selected an element displayed in the image area using the process of FIG. 4, a user may now move or resize the element. FIG. 5 is a flowchart of a method for moving and/or resizing an element in the video window of the trigger screen. Move and resize process 500 begins with step 502 where a mousemove event is received. A mouse move event occurs when a mouse button is activated while the mouse is positioned over an element and the mouse is moved. Step 504 determines if the mouse is positioned over a resize knob displayed in conjunction with a selected element. If step 504 determines that the mouse position does not correspond to a knob, step 506 moves the element using mouse movement information. The size of the element is not altered and processing ends at step 508. If the position of the mouse corresponds to a knob of the element, step 510 checks if the knob corresponds to a west (left side) knob. If the west knob is selected, step 512 checks if the west knob is a lower left knob. If the knob is not the lower left knob, step 514 resizes the element by changing the left coordinates of the element and keeping the right edge position and height of the element unchanged. Processing then ends at step 516. If step 512 determines that a lower left knob is selected, step 518 adjusts the height and width of the element, maintaining the aspect ratio of the element and the position of the upper right corner of the element. Processing then ends at step 516. If step 510 determines that the west knob is not selected, step 520 checks if the east knob (right side) was selected. If the east knob is selected, step 522 checks if the east knob is an upper right knob. If the knob is not an upper right knob, step 524 resizes the element by changing the right coordinates of the element and keeping the left edge position and height of the element unchanged. Processing then ends at step 526. If step 522 determines that an upper right knob is selected, step 528 adjusts the height and width of the element, maintaining the aspect ratio of the element and the position of the lower left corner of the element. Processing then ends at step 526. If step 520 determines that an east knob is not selected, step 530 checks if a north knob is selected. If a north knob is selected, step 532 checks if the upper left knob was selected. If the upper left knob was not selected, step 534 resizes the element by changing the top coordinates and keeping the bottom coordinates and width of the element unchanged. Processing then ends at step 536. If step 532 determines that the upper left knob was selected, step 538 adjusts the height and width of the element while maintaining the aspect ratio of the element and the position of the bottom right coordinate. Processing then ends at step 536. If step 530 determines that a north knob was not selected, step 540 checks if a lower right knob was selected. If a lower right knob was not selected, step 542 adjusts the height of the element, keep the width and top coordinates unchanged. Processing then ends at step 544. If step 540 determines that the knob is a lower right knob, step 546 adjusts the height and width of the element while maintaining the aspect ratio of the element and the position of the top left coordinate. Processing then ends at step 544. Appendix A lists code to implement the 'drag and drop' and 'resize' functions described in FIG. 4 and FIG. 5.

Figure 6:
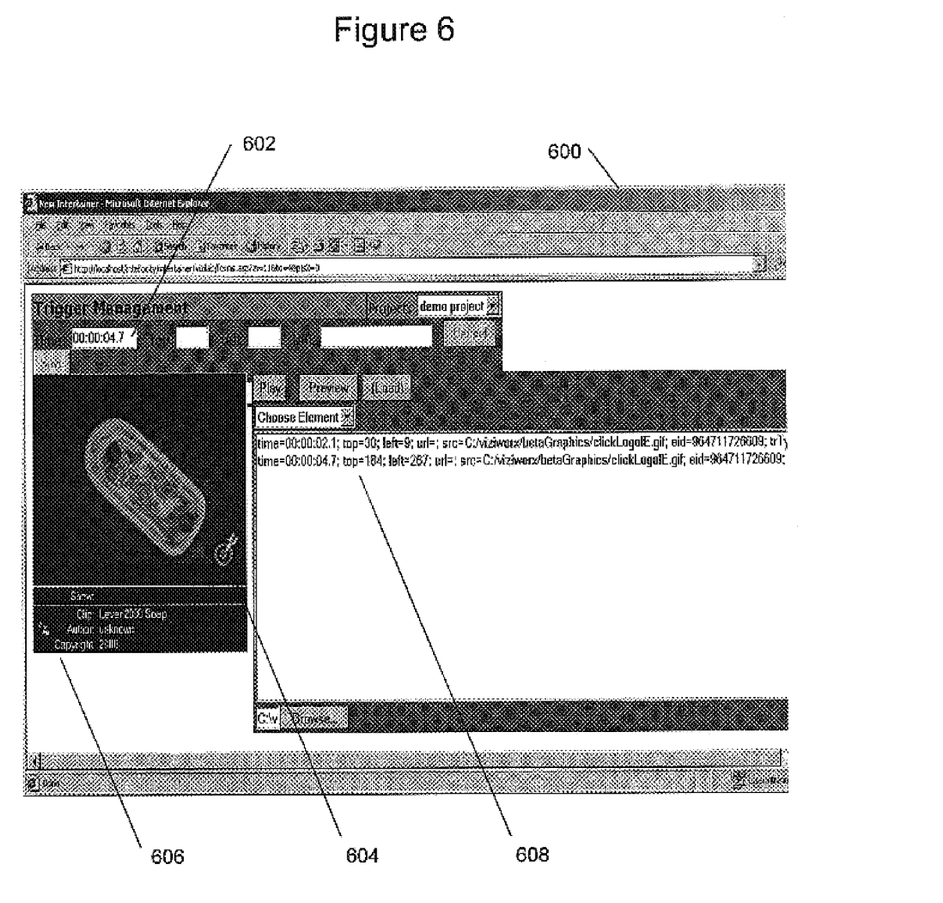
FIG. 6 depicts a trigger window reflecting a second video time and an element at a second position.

FIG. 6 depicts a trigger window reflecting a second video time and an element at a second position. In FIG. 6 the video has been advanced to the time shown in time window 602. Employing the 'drag and drop' functions described in FIGS. 4 and 5, the target with arrow element 604 has been moved to a position in the lower right of video window 606. Trigger entry 608 lists the time, position and element information for the newly positioned element.

Figure 7:
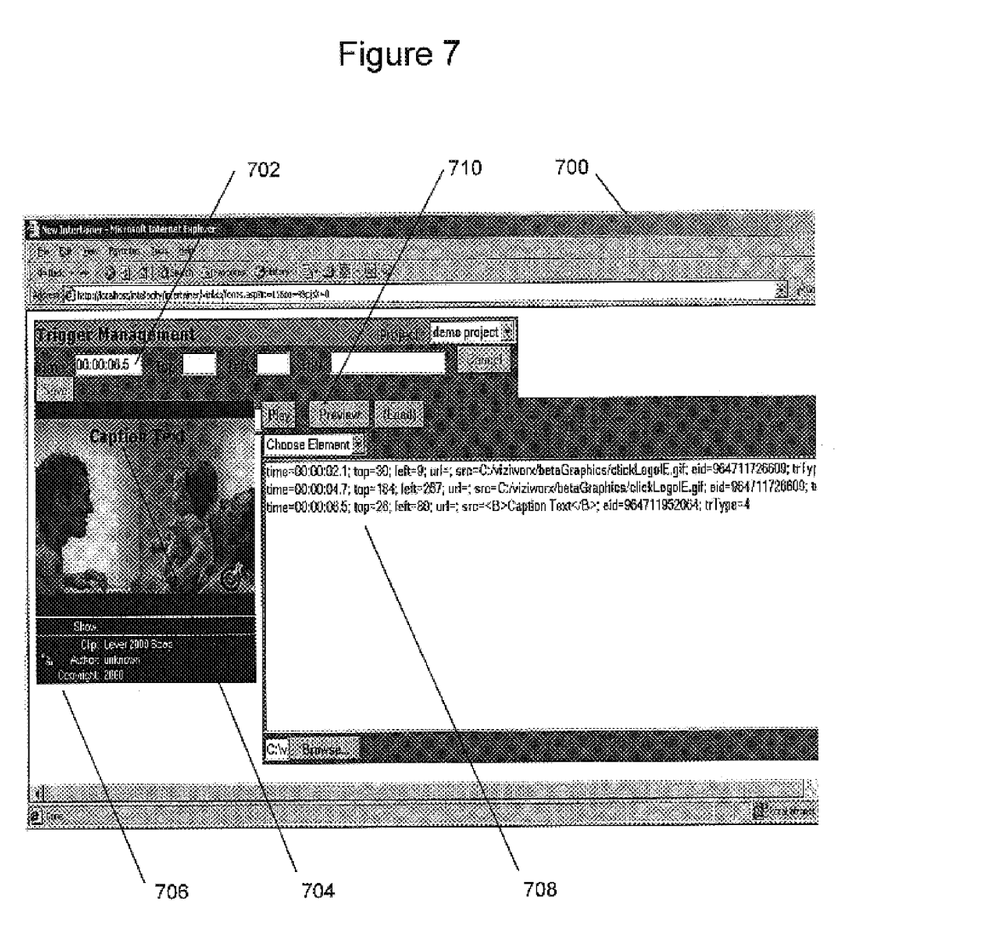
FIG. 7 depicts a third video time with text placed in the video window.

FIG. 7 depicts a third video time with text placed in the video window. In FIG. 7 the video has been advanced to the time shown in time window 702. Text 704, showing 'Caption Text ', has been placed in video window 706. Trigger entry 708 lists the time, position and element information for the newly positioned text element. Font and type size are specified in trigger entry 708. A user may preview enhancements by selecting preview button 710. Preview mode creates an enhanced streaming media file and HTML/ Javascript wrapper as previously described.

Figure 8:
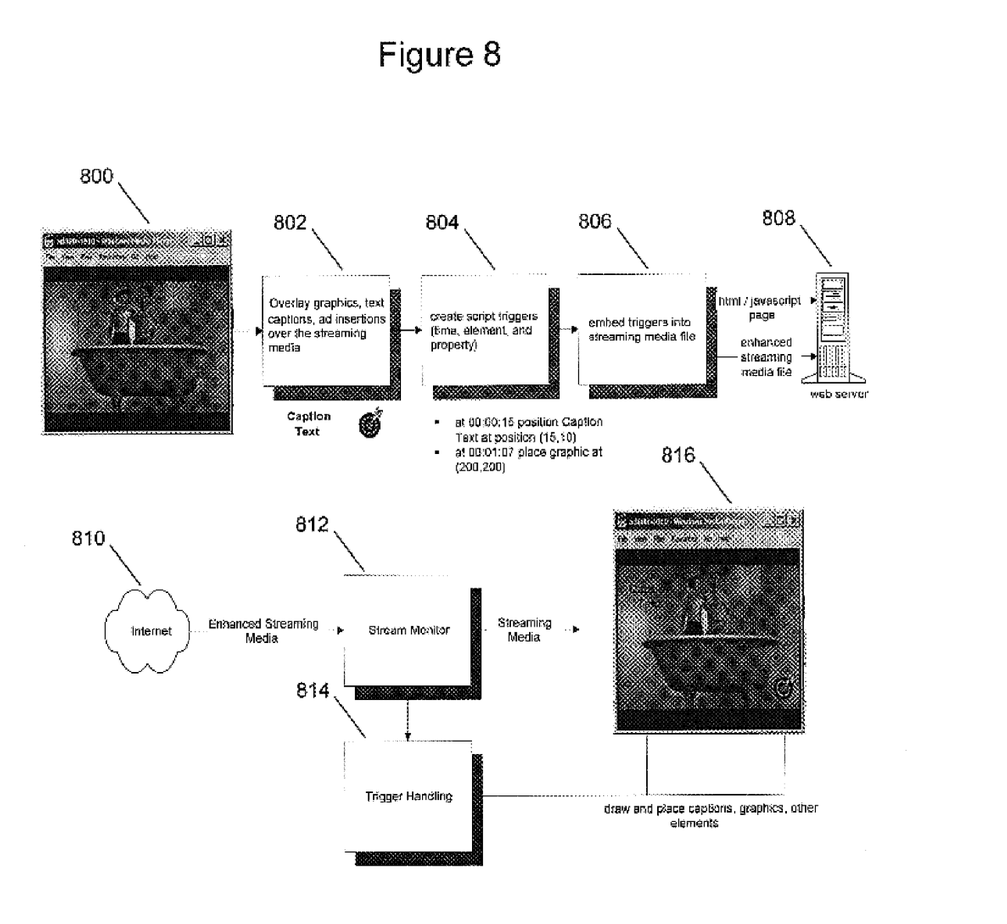
FIG. 8 is a functional summary of one embodiment of the present invention.

FIG. 8 is a functional summary of one embodiment of the present invention. Steps 800 to 808 depict creation of an enhanced video stream. Steps 810 to 816 depict utilization of an enhanced video stream. At step 800, a video frame of a video file is selected. At step 802, enhancements are selected and positioned in one or more video frames. At step 804, a script containing triggers and element description is produced. At step 806, the trigger script information is embedded in the video stream and an HTML/Javascript page is created. At step 808, the embedded video stream and HTML/Javascript page is stored in a server. At step 810, an enhanced stream is transferred across a network, which may be the Internet or other network, in response to a user selecting a URL or other locator containing the enhanced streaming video file. When the file is loaded, stream monitor 812 and trigger handler 814 are loaded to the viewer's system. Stream monitor 812 delivers streaming media to the user's media player while monitoring the stream for trigger information. When a trigger is found, trigger handler 814 may access a URL contained in the trigger to access enhancement information and then render the enhancements on media player 816.

FIG. 8 depicts an embodiment where trigger information is embedded in the video stream, and an HTML/Javascript program interprets trigger information, including a locator such as a URL, to access enhancement information that is then rendered. In another embodiment, the embedded video stream may be modified to contain both triggers and enhancement information. In yet another embodiment, The HTML/Javascript page may be configured to monitor time information from a media player and to compare the time information with a list of trigger times contained in the HTML/Javascript page file, and to access and render enhancements when a listed trigger time occurs. Embodiments that employ a locator to access enhancement information may also comprise pre-fetching of enhancement information to accommodate access latencies. One pre-fetch embodiment may employ a 'pre-trigger' that results in the enhancement information for an upcoming trigger to be accessed. Another pre-fetch embodiment may access information for a next trigger when a current trigger has been executed. Yet another pre-fetch embodiment may define a buffer, such as a FIFO, for example, and may access enhancement information in response to a FIFO pointer value.

The above-described authoring methods may employ a web browser such that users may remotely access the authoring and preview functions. The editing functions described provide a base set of capabilities. The elements selected through the element window 214 of FIG. 2 may include executable elements, such as animated sequences. Additional capabilities such as those described in the referenced application entitled 'SYSTEM AND METHOD FOR WEB BASED ENHANCED INTERACTIVE TELEVISION CONTENT PAGE LAYOUT' maybe employed.

The foregoing description of the invention has been presented for purposes of. illustration and description. It is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

APPENDIX A

CODE EXAMPLE FOR CLICK & DRAG TO PLACE ELEMENTS AND TO RESIZE THEM

```
Note: Numerical references shown in bold after '//' relate
the section of code to a component of the figures. The figures are
representative of the actions performed and may not reflect the
exact order or functions performed.
function mouseDown()    //400
{
    //404: Was the MouseDown inside of the DivPg(Canvas) ?
        if ( event.x >= divPg.offsetLeft + divMain.offsetLeft
            && event.x <= divPg.offsetLeft - 0 + divPg.offsetWidth +
divMain.offsetLeft
            && event.y >= divPg.offsetTop + divMain.offsetTop
            && event.y <= divPg.offsetTop - 0 + divPg.offsetHeight +
divMain.offsetTop )
    {
                // Yes.
                var el = event.srcElement;
                var pE1 = el.parentElement;
                var i;
                    var isText = false;
                //406: Are we positioned inside a knob?
                if (el.id.indexOf("_knob", 0) == 0)
                {
                    // 408 Yes, we are on a knob, and the user
wants to resize the element.
                            initlX = event.clientX;
                            initlY = event.clientY;
                            knob = el;
                            hideKnobs ();
                            MouseDownOnElement = true;
                }
                else //412:
                {
                        while (true)
                        {
                            if (el.tagName == "BODY")
                            return;
                            if (pEl.tagName == "BODY")
                            return;
                            if (pEl.tagName == "DIV" &&
pEl.id.indexOf("divEl") >=0) break;
                            el = pEl;
                            pEl = el.parentElement;
                        }
                        if (el.tagName == "DIV")
                        { // TEXT AREA
                            ob = el.style;
                        }
                        else
                        {
                            ob = pEl.style;
                        }
                //416
                    initlx = event.clientX;
                    initlY = event.clientY;
                    initlObjX = ob.posLeft;
                    initlObjY = ob.posTop;
                    elWidth = el.offsetWidth;
                    elHeight = el.offsetHeight;
                    elName = el.id;
                    i = elName.slice(5);
                //418: Did the user select a different
                element ?
                    if (elementSelected == i)
                    {
                            MouseDownOnElement = true;
                            // 420: Change to newly selected
```

APPENDIX A-continued

CODE EXAMPLE FOR CLICK & DRAG TO PLACE ELEMENTS AND TO RESIZE THEM

```
                            element
                            elementSelected = i;
                            selectElement (i);
                            hideKnobs ();
                    }
                    else    //424
                    {
                            var updated = true;
                            //***** update display with
                            selected element
                            if (elementSelected > -1)
                            {
                                    updated = updEls
                                    (elementSelected);
                            }
                            if (updated)
                            {
                                    MouseDownOnElement =
                                    true;
                                    // Change to newly selected
                                    element
                                    elementSelected = i;
                                    selectElement (i);
                                    hideKnobs ();
                            }
                    }
                }
        }
}
function mouseMove()        //500
{
    if (MouseDownOnElement)
    {
            var fp = window.frmElProps;
            var pEl;
            var elType;
                if (knob)   //504
            {
                    var e = eval ("window.elImg" +
                    elementSelected);
                    elType = parseInt (elements [elementSelected]
                    [eElType]);
                    if( elType == kElIsTA )
                    {
                            pEl = e;
                            e = e.style;
                    }
                    else
                    {
                            pEl = e.parentElement;
                    }
                            var delta;
                    switch (knob.style.cursor)
                    {
                            case "w-resize":   //510
                            {
                                    delta =initlX -
                                    event.clientX;
                                    if (elType !=
                                    kElIsTV)   //512
                                    {
                                            if (pEl.style.
                                            pixelLeft -
                        delta <= 0)   //518
                                            {
                                                    delta =
                                                    pEl.style.
                                                    pixelLeft;
                                                    pEl.style.
                                                    pixelLeft = 0;
                                            }
                                            else
                                            {
                                                    pEl.style.
                                                    pixelLeft -=
                                                    delta;
```

APPENDIX A-continued

CODE EXAMPLE FOR CLICK & DRAG TO
PLACE ELEMENTS AND TO RESIZE THEM

```
            }
         }
         switch( elType )   //514
         {
            case kElIsGraphic:
            case kElIsBG:
               e.width += delta;
               break;
            case kElIsTA:
               e.width =
Math.abs(parseInt(e.width) + delta) + "px";
               break;
            case    //518
            kElIsTV:
               // Compute
               available
               WEST & South
pixels
               var Wpx =
               pEl.style.
               pixelLeft;
               var Spx =
               gCanvasH -
(pEl.style.pixelTop + e.height);

while( delta >
               Wpx ||
(gCanvasH/gCanvasW) *delta > Spx )
               {
                  --delta;
                  if (delta ==
                  0) break;
               }
               pEl.style.
               pixelLeft -=
               delta;
               e.width +=
               delta;
               e.height =
               e.width *
(gCanvasH/gCanvasW);
               break;
            default:
               break;
         }
         break;
      }
      case "e-resize":   //520
      {
         var w;
         delta =event.clientX -
         initlX;
         switch( elType )   //522
         {
            case    //524
            kElIsGraphic:
            case kElIsBG:
               w = e.width +
               delta;
               if( pEl.style.
               pixelLeft + w >
gCanvasW )
               {
                  w = gCanvasW -
pEl.style.pixelLeft;
               }
               e.width = w;
               break;
            case    //524
            kElIsTA:
               w = Math.abs
               (parseInt
(e.width) + delta);
               if( pEl.style.
pixelLeft + w >= gCanvasW )
               {
                  w =
```

APPENDIX A-continued

CODE EXAMPLE FOR CLICK & DRAG TO
PLACE ELEMENTS AND TO RESIZE THEM

```
gCanvasW - pEl.style.pixelLeft;
               }
               e.width = w +
               "px";
               break;
            case    //528
            kElIsTV:
               // Compute var Epx =
available EAST & South pixels
gCanvasW - (pEl.style.pixelLeft + e.width);
               var Spx =
gCanvasH - (pEl.style.pixelTop + e.height);

while( delta >
               Epx || (gCanvasH/gCanvasW)*delta > Spx )
               {
                  --delta;
                  if (delta == 0)
                     break;
               }
               e.width += delta;
(gCanvasH/gCanvasW);    e.height = e.width *
               break;
            default:
               break;
         }
         break;
      }
      case "n-resize"    //530
      {
         var h;
         delta = initlY -
         event.clientY;
         if         //532
         (elType != kElIsTV)
         {
            if(pEl.style.
            pixelTop -
            delta < 0)
            {
               delta =
               pEl.style.
               pixelTop;
               pEl.style.
               pixelTop = 0;
            }
            else
            {
               pEl.style.
               pixelTop -=
               delta;
            }
         }
         switch( elType )   //534
         {
            case    //538
            kElIsGraphic:
            case kEkIsBG:
               e.height +=
               delta;
               break;
            case    //538
            kElIsTA:
               e.height =
Math.abs(parseInt(e.height) + delta) + "px";
               break;
            case kElIsTV:
               // Compute available
NORTH & West pixels
               var Npx = pEl.
               style.pixelTop;
gCanvasW - (pEl.style.pixelLeft + e.width);
               var Wpx = while( delta >
               Npx ||
```

APPENDIX A-continued

CODE EXAMPLE FOR CLICK & DRAG TO
PLACE ELEMENTS AND TO RESIZE THEM

```
(gCanvasW/gCanvasH) *delta > Wpx )
                          {
                            --delta;
                            if (delta ==
                              0) break;
                          }
                          pEl.style.
                          pixelTop -=
                          delta;
                          e.height +=
                          delta;
                          e.width +=
                          e.height *
(gCanvasW/gCanvasH);
                          break;
                        default:
                          break;
                      }
                    break;
                  }
                case "s-resize":
                  {
                    var h;
                    delta = event.
                    clientY - initY;
                    switch( elType )   //540
                    {
                      case    //542
                      kElIsGraphic:
                      case kElIsBG:
                        h = e.height +
                        delta;
                        if( pEl.style.
pixelTop + h > gCanvasH )
                        {
                          h =
gCanvasH - pEl.style.pixelTop;
                        }
                        e.height = h;
                        break;
                      case    //542
                      kElIsTA:
                        h = Math.abs
(parseInt(e.height) + delta);
                        if( pEl.style.
pixelTop + h > gCanvasH
                        {
                          h =
(gCanvasH - pEl.style.pixelTop);
                        }
                        e.height = h +
                        "px";
                        break;
                      case    //546
                      kElIsTv:
                        // Compute available
SOUTH & West pixels
                        var Wpx =
gCanvasW - (pEl.style.pixelLeft + e.width);
                        var Spx =
gCanvasH - (pEl.style.pixelTop + e.height);
                        while ( delta >
(gCanvasW/gCanvasH)*delta > Wpx )    Spx ||
                        {
                          --delta;
                          if (delta ==
                            0) break;
                        }
                        e.height += delta;
                        e.width =
                        e.height *
(gCanvasW/gCanvasH);
                        break;
                      default:
                        break;
```

APPENDIX A-continued

CODE EXAMPLE FOR CLICK & DRAG TO
PLACE ELEMENTS AND TO RESIZE THEM

```
                    } // switch( elType )
                    break;
                  } // case s-resize:
                } // switch( knob.style.cursor )
              var el = elements
              [elementselected];                //506
              fp.txtLeft.   = el[eElLeft]    = pEl.style.
              value                          pixelLeft;
              fp.txtTop.    = el[eElTop]     = pEl.style.
              value                          pixelTop;
              fp.           = el             = (elType ==
              txtWidth.     [eElWidth]       kElIsTA ?
              value
parseInt(e.width) : e.width);
                            fp.txtHeight.value = el[eElHeight] =
                            (elType == kElIsTA ?
parseInt(e.height) : e.height);
                            }
              if (ob)
              {
                if (ob pixelLeft + event.clientX -
                  initX < 0)
                    ob.pixelLeft = 0;
                else
                    ob.pixelLeft += event.clientX -
                    initX;
                if (ob.pixelLeft + elWidth + event.clientX -
initX > window.divPg.clientWidth)
                    ob.pixelLeft = window.divPg.
                    clientWidth - elWidth;
                if (ob.pixelTop + event.clientY -
                  initY < 0)
                    ob.pixelTop = 0
                else
                    ob.pixelTop += event.clientY -
                    initY;
                if (ob.pixelTop + elHeight +
event.clientY - initY > window.divPg.clientHeight)
                    ob.pixelTop = window.divPg.
                    clientHeight - elHeight;
                fp.txtLeft.value = elements
[elementSelected] [eElLeft] = ob.pixelLeft;
                fp.txtTop.value = elements[elementSelected]
[eElTop] = ob.pixelTop;
              }
              initX = event.clientX;
              initY = event.clientY;
            }
        return false;
}
```

What is claimed is:

1. A method for creating an enhanced streaming media file comprising:

defining a first window in a graphical user interface;

displaying a streaming video file in a media player window contained in said first window;

pausing said media player at one frame of a plurality of frames comprising said streaming video file;

placing a displayable element at a position in said first window employing a pointing device and employing a drag and drop function responsive to an input from said pointing device, said drag and drop function implemented locally in said graphical user interface;

creating an enhancement file containing information related to said displayable element, and said one frame;

modifying a file containing a video stream to produce a modified video stream file containing a trigger comprising information that identifies a video frame to be enhanced and a locator indicating where enhancement information may be accessed; and embedding a media player and a software routine in a web displayable page wherein said media player is operable to display a video stream, and said software routine is operable to detect a trigger in said video stream, to access enhancement information employing a locator in said video stream, and to render enhancements defined by said enhancement information.

2. The method of claim 1 wherein said step of embedding further comprises:

creating an HTML/Javascript web page containing said media player and said software routine.

3. The method of claim 1 further comprising:

employing a resize function implemented locally in said graphical user interface to alter the size of said displayable element.

4. The method of claim 1 where said enhancement file further comprises:

an XML compliant script file.

5. The method of claim 1 further comprising:

employing a database to store information describing said displayable element, and said one frame.

6. The method of claim 1 further comprising:

saving said modified video stream file and said web displayable page on a server.

7. The method of claim 1 wherein a link is associated with said displayable element.

8. The method of claim 1 wherein said displayable element is an imported element.

9. An enhanced streaming media file, embodied in a machine-readable medium, created by the steps of:

defining a first window in a graphical user interface;

displaying a streaming video file in a media player window contained in said first window;

pausing said media player at one frame of a plurality of frames comprising said streaming video file;

placing a displayable element at a position in said first window employing a pointing device and employing a drag and drop function implemented locally in said graphical user interface;

creating an enhancement file containing information related to said displayable element, and said one frame;

modifying a file containing a video stream to produce a modified video stream file containing a trigger comprising information that identifies a video frame to be enhanced and a locator indicating where enhancement information may be accessed; and embedding a media player and a software routine in a web displayable page wherein said media player is operable to display a video stream, and said software routine is operable to detect a trigger in said video stream, to access enhancement information employing a locator in said video stream, and to render enhancements defined by said enhancement information.

10. The enhanced streaming media file of claim 9 wherein said step of embedding further comprises:

creating an HTML/Javascript web page comprising said media player and said software routine.

11. The streaming media file of claim 9 wherein said enhancement file is a text file.

12. The streaming media file of claim 9 further comprising the step of:

saving said modified video stream file and said web displayable page on a server.

13. The streaming media file of claim 9 wherein said enhancement file further comprises:

an XML compliant script file.

14. A system for creating an enhanced streaming media file comprising:

a computer;

a web browser;

a graphical user interface disposed in said browser;

a streaming media player disposed in said graphical user interface;

a first program associated with said graphical user interface that allows a user to select a displayable element and to position said displayable element over an image displayed by said streaming media player, said first software program further provides a function to alter the position of said displayable element in response to input from a pointing device, said function implemented locally in said graphical user interface;

a second program that embeds information associated with said displayable element into a streaming media file; and a third program that produces a web displayable page that embeds a media player operable to display a video stream and a software routine that detects a trigger contained in said video stream and that accesses enhancement information and renders an enhancement in response to said trigger.

15. The system of claim 14 further comprising:

a preview function that employs said second program and said third program to display an enhanced video stream on said web browser.

16. The system of claim 14 wherein said first program further comprises:

a resize function implemented locally in said graphical user interface that allows a user to alter the size of a displayed element.

17. The system of claim 14 further comprising:

a database that stores said information associated with said element.

18. The system of claim 14 wherein said displayable element is an imported element.

19. The system of claim 14 where a link is associated with said displayable element.

20. The system of claim 14 wherein said third program further comprises:

an HTML/Javascript web page containing said media player and said software routine.

* * * * *